US012596592B2

(12) United States Patent
Bai et al.

(10) Patent No.: US 12,596,592 B2
(45) Date of Patent: Apr. 7, 2026

(54) METHOD AND APPARATUS FOR UPDATING CLOUD PLATFORM

(71) Applicants: Beijing Jingdong Shangke Information Technology Co., Ltd., Beijing (CN); Beijing Jingdong Century Trading Co., Ltd., Beijing (CN)

(72) Inventors: Shi Bai, Beijing (CN); Chen Liu, Beijing (CN); Dayong Wang, Beijing (CN); Zhipeng Han, Beijing (CN); Zhifan Wang, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 108 days.

(21) Appl. No.: 18/021,963

(22) PCT Filed: Aug. 13, 2021

(86) PCT No.: PCT/CN2021/112542
§ 371 (c)(1),
(2) Date: Feb. 17, 2023

(87) PCT Pub. No.: WO2022/048427
PCT Pub. Date: Mar. 10, 2022

(65) Prior Publication Data
US 2023/0393836 A1 Dec. 7, 2023

(30) Foreign Application Priority Data

Sep. 1, 2020 (CN) ........................ 202010903173.X

(51) Int. Cl.
*C12N 15/10* (2006.01)
*G06F 9/50* (2006.01)
(Continued)

(52) U.S. Cl.
CPC .......... *G06F 9/5077* (2013.01); *G06F 9/5072* (2013.01); *H04L 67/10* (2013.01); *H04L 67/34* (2013.01); *G06F 2209/505* (2013.01)

(58) Field of Classification Search
CPC ........ G06F 8/65; G06F 9/5072; G06F 9/5077; G06F 9/45558; H04L 67/10; H04L 67/34
See application file for complete search history.

(56) References Cited

U.S. PATENT DOCUMENTS 8,832,808 B2 * 9/2014 Liu ....................... H04W 12/06
726/6
2014/0282944 A1 9/2014 Li
(Continued)

FOREIGN PATENT DOCUMENTS

CN 107229646 A 10/2017
CN 109067828 A 12/2018
(Continued)

OTHER PUBLICATIONS

International Search Report and Written Opinion for International Application No. PCT/CN2021/112542, dated Oct. 20, 2021, 8 pages.
(Continued)

*Primary Examiner* — S. Sough
*Assistant Examiner* — Mohammad H Kabir
(74) *Attorney, Agent, or Firm* — Buchanan Ingersoll & Rooney PC

(57) ABSTRACT

A method and an apparatus for updating a cloud platform are provided. The method may include: in response to receiving a cloud platform update request, acquiring to-be-used updat-
(Continued)

100 ing cluster gene information corresponding to the cloud platform update request, wherein the to-be-used updating cluster gene information is structured information that completely represents information of components in a cloud platform container cluster; updating a standard cloud platform gene library according to a comparison result between the to-be-used updating cluster gene information and cluster gene information of a current standard cloud platform, wherein the standard cloud platform is a unified cloud platform on which a customer-specific cloud platform is deployed; and determining, according to an updated standard cloud platform gene library, a hardware resource of a final standard cloud platform and a software resource of the final standard cloud platform.

15 Claims, 4 Drawing Sheets

(51) Int. Cl.
| | | |
|---|---|---|
| *G06K 9/62* | (2022.01) | |
| *H04L 67/00* | (2022.01) | |
| *H04L 67/10* | (2022.01) | |

(56) References Cited

U.S. PATENT DOCUMENTS

| 2015/0329854 A1* | 11/2015 | Bang .................. C12N 15/1089 |
|---|---|---|
| | | 506/17 |
| 2017/0168797 A1 | 6/2017 | Pogrebinsky |
| 2019/0369980 A1 | 12/2019 | Mair et al. |
| 2020/0028580 A1 | 1/2020 | Lauer |
| 2020/0153898 A1 | 5/2020 | Sabath et al. |
| 2020/0167604 A1* | 5/2020 | Shah .................... G06V 30/274 |
| 2021/0271521 A1 | 9/2021 | Kang |

FOREIGN PATENT DOCUMENTS

| CN | 110286930 A | 9/2019 |
|---|---|---|
| CN | 110583005 A | 12/2019 |
| CN | 110912975 A | 3/2020 |
| CN | 111324417 A | 6/2020 |
| CN | 112346816 A | 2/2021 |
| JP | 2006511100 A | 3/2006 |
| JP | 2019056986 A | 4/2019 |
| WO | 2020017847 A1 | 1/2020 |

OTHER PUBLICATIONS

Office Action (Communication pursuant to Article 94(3) (EPC) issued Mar. 28, 2025, by the European Patent Office in corresponding European Patent Application No. 21 863 494.7-1203. (16 pages).

* cited by examiner

<u>100</u>

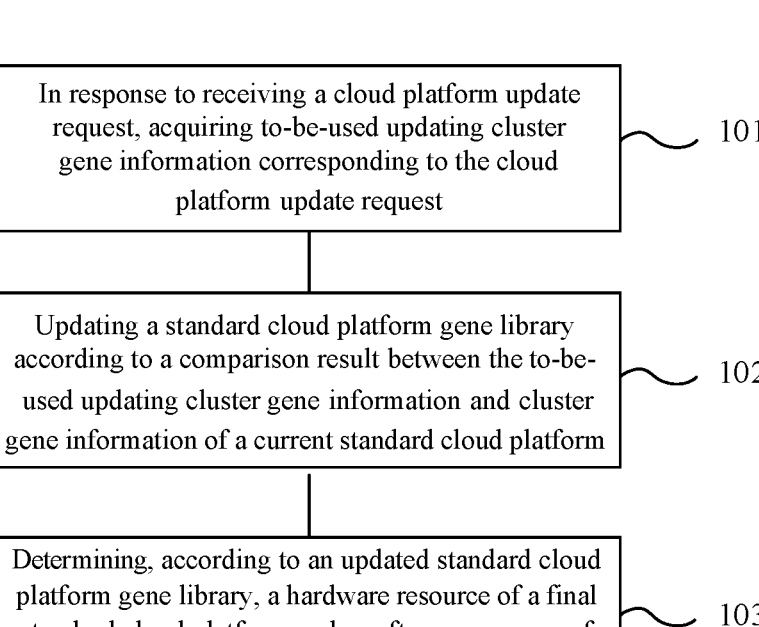

In response to receiving a cloud platform update request, acquiring to-be-used updating cluster gene information corresponding to the cloud platform update request — 101

Updating a standard cloud platform gene library according to a comparison result between the to-be-used updating cluster gene information and cluster gene information of a current standard cloud platform — 102

Determining, according to an updated standard cloud platform gene library, a hardware resource of a final standard cloud platform and a software resource of the final standard cloud platform — 103

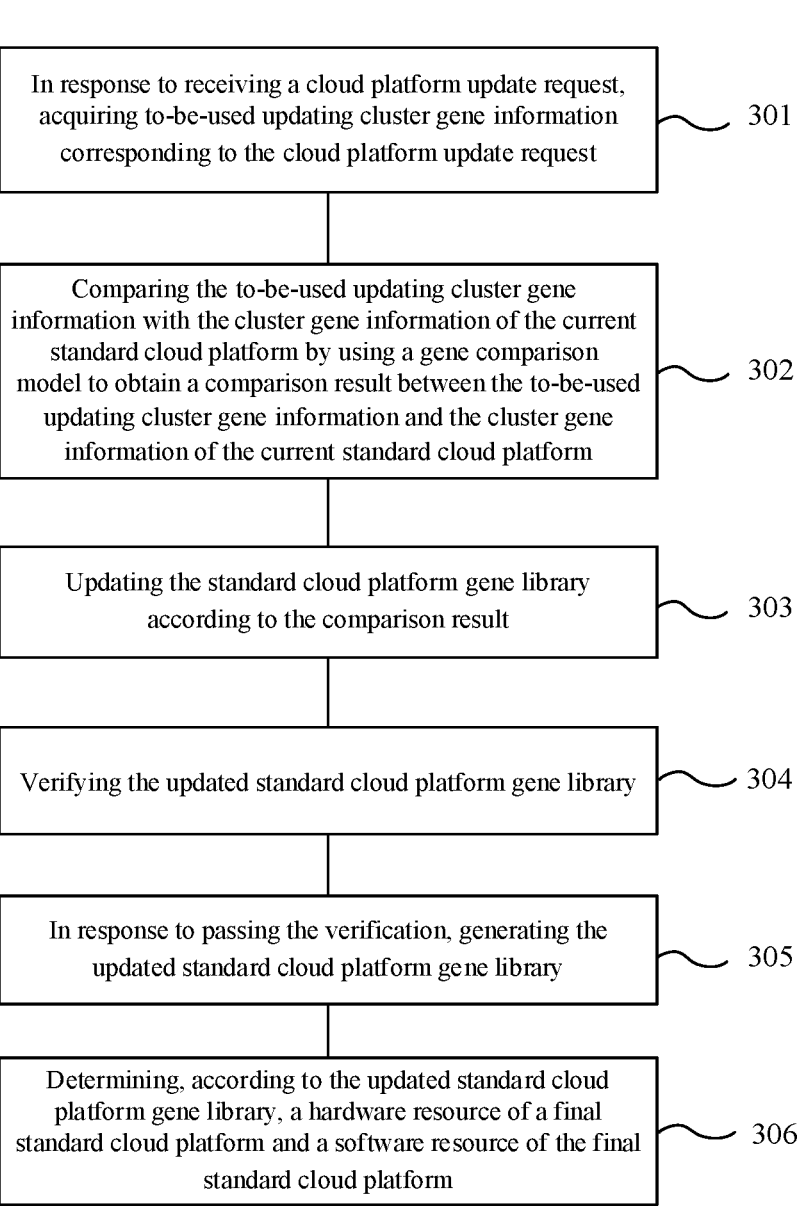

In response to receiving a cloud platform update request, acquiring to-be-used updating cluster gene information corresponding to the cloud platform update request — 301

Comparing the to-be-used updating cluster gene information with the cluster gene information of the current standard cloud platform by using a gene comparison model to obtain a comparison result between the to-be-used updating cluster gene information and the cluster gene information of the current standard cloud platform — 302

Updating the standard cloud platform gene library according to the comparison result — 303

Verifying the updated standard cloud platform gene library — 304

In response to passing the verification, generating the updated standard cloud platform gene library — 305

Determining, according to the updated standard cloud platform gene library, a hardware resource of a final standard cloud platform and a software resource of the final standard cloud platform — 306

METHOD AND APPARATUS FOR UPDATING CLOUD PLATFORM

CROSS-REFERENCE TO RELATED APPLICATIONS

This patent application is a national stage of International Application No. PCT/CN2021/112542, filed on Aug. 13, 2021, which claims the priority of Chinese Patent Application No. 202010903173. X filed on Sep. 1, 2020. The contents of each of the aforementioned applications are hereby incorporated by reference in their entireties.

TECHNICAL FIELD

The present disclosure relates to the field of computer technology, in particular to the field of cloud computing technology, and more particularly, to a method and apparatus for updating a cloud platform.

BACKGROUND OF THE INVENTION

Proprietary cloud uses a hierarchical management architecture and may be used to support large, complex, and dynamic customer service systems. A bottom layer of the proprietary cloud architecture supports physical server clusters, and supports various service systems of users by providing products, resources and services such as infrastructure as a service (IaaS), platform as a service (PaaS), and software as a service (SaaS).

Proprietary cloud uses container cluster technology to organize and manage application service programs.

SUMMARY OF THE INVENTION

The present disclosure provides a method and apparatus for updating a cloud platform, and a storage medium.

According to a first aspect of the present disclosure, a method for updating a cloud platform is provided, and the method includes: in response to receiving a cloud platform update request, acquiring to-be-used updating cluster gene information corresponding to the to-be-used updating cloud platform update request, where the cluster gene information is structured information that completely represents information of components in a cloud platform container cluster; updating a standard cloud platform gene library according to a comparison result between the to-be-used updating cluster gene information and cluster gene information of a current standard cloud platform, where the standard cloud platform is a unified cloud platform on which a customer-specific cloud platform is deployed; and determining, according to an updated standard cloud platform gene library, a hardware resource of a final standard cloud platform and a software resource of the final standard cloud platform.

According to a second aspect of the present disclosure, an apparatus is provided. The apparatus includes at least one processor; and a memory communicatively connected to the at least one processor; where, the memory stores instructions executable by the at least one processor, and the instructions, when executed by the at least one processor, cause the at least one processor to perform the method described in any implementation of the first aspect.

According to a third aspect of the present disclosure, a non-transitory computer readable storage medium storing computer instructions is provided. The computer instructions are used to cause the computer to perform the method described in any implementation of the first aspect.

It should be understood that the content described in this section is not intended to identify key features or embodiments of the present disclosure, nor is it intended to limit the scope of the present disclosure. Other features of the present disclosure will become readily understood from the following description.

BRIEF DESCRIPTION OF THE DRAWINGS

The accompanying drawings are used for better understanding of the present solution, and do not constitute a limitation to the present disclosure.

FIG. 1 is a schematic diagram of a first embodiment of a method for updating a cloud platform according to the present disclosure;

FIG. 3 is a schematic diagram of a second embodiment of a method for updating a cloud platform according to the present disclosure;

DETAILED DESCRIPTION OF THE INVENTION

Figure 2:
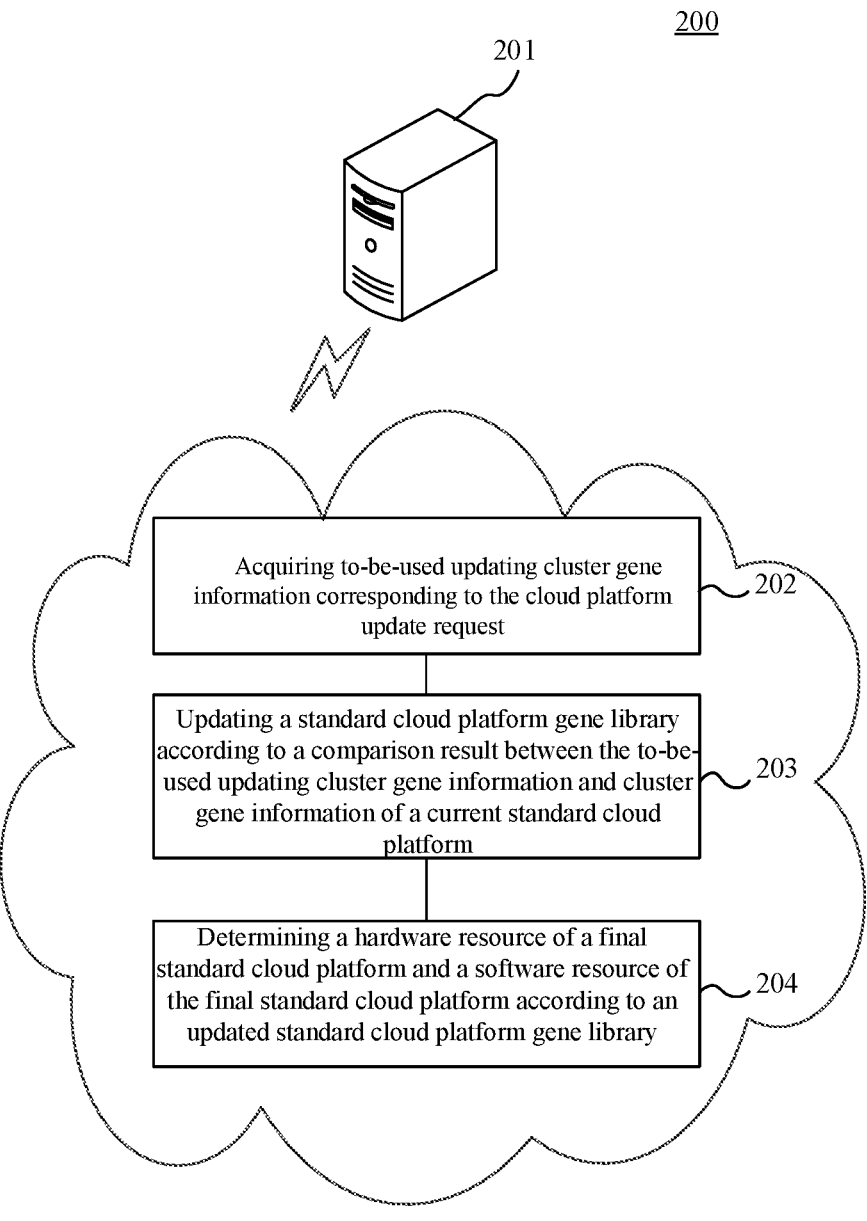
FIG. 2 is a scenario diagram in which the method for updating a cloud platform according to an embodiment of the present disclosure may be implemented.

Example embodiments of the present disclosure are described below with reference to the accompanying drawings, where various details of the embodiments of the present disclosure are included to facilitate understanding, and should be considered merely as an example. Therefore, those of ordinary skills in the art should realize that various changes and modifications may be made to the embodiments described herein without departing from the scope and spirit of the present disclosure. Similarly, for clearness and conciseness, descriptions of well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

In the related art, gradual migration for a service system may be implemented based on a flexible migration capability of the container itself, but for a complex and huge container cluster environment of an ultra-large-scale proprietary cloud platform, there is a lack of a systematic automatic upgrade technology based on a standard cloud platform container cluster.

FIG. 1 shows a schematic diagram 100 of a first embodiment of a method for updating a cloud platform according to the present disclosure. The method for updating a cloud platform includes the following steps.

Step 101 includes in response to receiving a cloud platform update request, acquiring to-be-used updating cluster gene information corresponding to the cloud platform update request.

In the present embodiment, after receiving the cloud platform update request, an executing body may acquire the to-be-used updating cluster gene information from other electronic devices or local through wired connection or wireless connection, and the cluster gene information may be extracted from a tested cloud platform which is deployed with the to-be-used updating cluster gene information. The to-be-used updating cluster gene information is structured information that may completely represent information of components in a cloud platform container cluster, through which automatic creation and component deployment of a same or similar cluster may be implemented. The cloud platform is built on the basis of container cluster gene. The components may include: components of platform system and components of product line, the components of platform system refer to basic core components for management and, schedule, etc. in the cloud platform, and the components of product line refer to components related to a product line, such as cloud hosts, cloud hard drives. The information includes: the number, configuration, composition, data, association relationship, or dependency relationship of the components. It should be noted that the above wireless connection may include, but is not limited to, 3G connection, 4G connection, 5G connection, WiFi connection, Bluetooth connection, WiMAX connection, Zigbee connection, UWB (ultra wideband) connection, and other wireless connection currently known or to be developed in the future.

Step 102 includes updating a standard cloud platform gene library according to a comparison result between the to-be-used updating cluster gene information and cluster gene information of a current standard cloud platform.

In the present embodiment, the executing body may compare pieces of the to-be-used updating cluster gene information acquired in step 101 with pieces of the cluster gene information of the current standard cloud platform one by one, and according to the comparison result, add a new piece of the to-be-used updating cluster gene information (that is, a piece of cluster gene information that is not included in the pieces of cluster gene information of the standard cloud platform) to a gene sequence of the standard cloud platform gene library, and replace pieces of cluster gene information in the original standard cloud platform gene library with non-new pieces of the to-be-used cluster gene information (existing pieces of cluster gene information in the cluster gene information of the standard cloud platform). The standard cloud platform may be a unified cloud platform on which a customer-specific cloud platform is deployed. The standard cloud platform is a proprietary cloud platform environment that has undergone long-term research and development and quality verification, and ensures that various technical indicators such as function, performance, stability, scalability, and security can meet technical standards. Technical capabilities of the proprietary cloud platform deployed at the client are to be deployed based on a standard proprietary cloud platform.

In some alternative implementations of the present embodiment, the standard cloud platform and/or the customer-specific cloud platform is a kubernetes-based container cluster platform. Based on advantages of kubernetes (k8s), the platform may be deployed quickly, accurately and safely.

Step 103 includes determining, according to an updated standard cloud platform gene library, a hardware resource of a final standard cloud platform and a software resource of the final standard cloud platform.

In the present embodiment, the executing body may determine the hardware resource of the final standard cloud platform and the software resource of the final standard cloud platform according to the updated standard cloud platform gene library information acquired in step 102 by using a platform determining method, so that the hardware resource of the final standard cloud platform and the software resource of the final standard cloud platform may be used for deployment of the customer-specific cloud platform. The customer-specific cloud platform refers to a proprietary cloud platform built in a customer-specific resource area.

Further referring to FIG. 2, the method 200 for updating a cloud platform in the present embodiment runs in an electronic device 201. After receiving a cloud platform update request, the electronic device 201 may first acquire to-be-used updating cluster gene information corresponding to the cloud platform update request 202, then the electronic device 201 may update a standard cloud platform gene library according to a comparison result between the to-be-used updating cluster gene information and cluster gene information of a current standard cloud platform 203, and finally the electronic device 201 may determine a hardware resource of a final standard cloud platform and a software resource of the final standard cloud platform according to the updated standard cloud platform gene library 204.

The method for updating a cloud platform is provided in the above embodiment of the present disclosure. The method includes: in response to receiving a cloud platform update request, acquiring to-be-used updating cluster gene information corresponding to the cloud platform update request, updating a standard cloud platform gene library according to a comparison result between the to-be-used updating cluster gene information and cluster gene information of a current standard cloud platform, and determining, according to an updated standard cloud platform gene library, a hardware resource of a final standard cloud platform and a software resource of the final standard cloud platform. The method solves the technical challenge of huge workload faced by a proprietary cloud platform in the deployment and upgrade process, and at the same time it solves the problem of the lack of technical standard system of the proprietary cloud platform. The method employs cluster gene replication and inheritance to realize an automatic update of a unified standard cloud platform.

Further referring to FIG. 3, FIG. 3 illustrates a schematic diagram 300 of a second embodiment of the method for updating a cloud platform. The flow of the method includes the following steps.

Step 301 includes in response to receiving a cloud platform update request, acquiring to-be-used updating cluster gene information corresponding to the cloud platform update request.

In some alternative implementations of the present embodiment, before the acquiring to-be-used updating cluster gene information corresponding to the cloud platform update request, the method further includes: verifying the to-be-used updating cluster gene information by using the current standard cloud platform, where the verification is used to verify a system stability of the cloud platform where the to-be-used updating cluster gene information is deployed; and in response to passing the verification, performing a subsequent step. A cloud platform upgrade technology based on a verified standard proprietary cloud platform container cluster is implemented, and based on the verified to-be-used updating cluster gene information, effectiveness of updating the standard cloud platform is improved.

Step 302 includes comparing the to-be-used updating cluster gene information with the cluster gene information of the current standard cloud platform by using a gene comparison model, to obtain the comparison result between the to-be-used updating cluster gene information and the cluster
gene information of the current standard cloud platform.

In the present embodiment, the executing body may
compare the to-be-used updating cluster gene information
with the cluster gene information of the current standard
cloud platform by using the gene comparison model, to
obtain the comparison result between the to-be-used updat-
ing cluster gene information and the cluster gene informa-
tion of the current standard cloud platform. The gene com-
parison model may make a comparison based on resource
types of pieces of gene data in the to-be-used updating
cluster gene information and a dependency relationship
between the pieces of gene data. The standard cloud plat-
form is a kubernetes-based container cluster platform.

Step 303 includes updating the standard cloud platform
gene library according to the comparison result.

In the present embodiment, the executing body may
update the standard cloud platform gene library according to
the comparison result obtained in step 302.

To further illustrate, the to-be-used updating cluster gene
information is compared with the cluster gene information
of the current standard cloud platform, to determine whether
there is a new basic resource (such as a server, a network, or
an operating system) in the to-be-used updating cluster gene
information. If there is the new basic resource, a piece of
gene data of the new basic resource is added to a new gene
sequence of the standard cloud platform; if there is no new
basic resource, whether in the to-be-used updating cluster
gene information, there is a new dependency relationship
based on the basic resource is determined. If there is the
dependency relationship based on the basic resource, a piece
of gene data of the new dependency relationship is added to
the new gene sequence of the standard cloud platform; if
there is no dependency relationship based on the basic
resource, whether there is a new component dependency
relationship in the to-be-used updating cluster gene infor-
mation is determined. If there is a new component depen-
dency relationship, pieces of gene data of the new compo-
nent dependency relationship is added to the new gene
sequence of the standard cloud platform; if there is no new
component dependency relationship, the original gene
sequence of the standard cloud platform is replaced with the
pieces of gene data in the to-be-used updating cluster gene
information, and the gene library information is updated so
that a new cluster gene library is consistent with the new
cluster gene information.

Step 304 includes verifying the updated standard cloud
platform gene library.

In the present embodiment, the executing body may
verify the updated standard cloud platform gene library,
based on integrity and consistency of pieces of gene data and
correctness of a dependency relationship between the pieces
of gene data in the updated standard cloud platform gene
library.

Step 305 includes in response to passing the verification,
generating the updated standard cloud platform gene library.

In the present embodiment, when receiving an instruction
indicating that the verification is passed, the executing body
determines that the verified updated standard cloud platform
gene library is a final updated standard cloud platform gene
library. A name of a new component in the final updated
standard cloud platform gene library is marked, and a new
version number for the final updated standard cloud platform
gene library is created, that is, the new version number is
created for the final updated standard cloud platform gene
library according to a version update rule (such as version number increasing), and new pieces of gene information are
labelled in the gene library of this version number.

In some alternative implementations of the present
embodiment, the method further includes: in response to not
passing the verification, marking an error of the updated
standard cloud platform gene library, and determining error
location information corresponding to the updated standard
cloud platform gene library. The determination of the error
information in the standard cloud platform gene library is
realized, and the specific error information is found.

Step 306 includes determining, according to an updated
standard cloud platform gene library, a hardware resource of
a final standard cloud platform and a software resource of
the final standard cloud platform.

In some alternative implementations of the present
embodiment, the method further includes: updating the
customer-specific cloud platform according to the final
standard cloud platform. The method solves the technical
problem of how to effectively upgrade the customer-specific
cloud platform by using an automatic method in a K8S
proprietary cloud container cluster environment, so that the
newly deployed customer-specific cloud platform environ-
ment meets baseline conditions for standardized deploy-
ment. Using the principle that cluster genes have complete
system information, smooth upgrade of the proprietary
cloud platform is realized.

In some alternative implementations of the present
embodiment, the method further includes: determining a
to-be-offline product line, according to the updated standard
cloud platform gene library; labeling cluster gene informa-
tion corresponding to the to-be-offline product line in the
standard cloud platform according to the to-be-offline prod-
uct line and based on a dependency relationship between
pieces of gene data in the cluster gene information; and
deleting the cluster gene information corresponding to the
to-be-offline product line in the standard cloud platform
based on the labeled information. The method realizes
effective recovery of resources and ensures simplicity and
effectiveness of the standard cloud platform gene library.

In the present embodiment, the operations of step 301 and
step 306 are basically the same as the operations of step 101
and step 103 in the embodiment shown in FIG. 1, and
detailed description thereof will be omitted.

As can be seen from FIG. 3, compared with the embodi-
ment corresponding to FIG. 1, the schematic diagram 300 of
the method for updating a cloud platform in the present
embodiment includes comparing the to-be-used updating
cluster gene information with the cluster gene information of
the current standard cloud platform by using the gene
comparison model, to obtain the comparison result between
the to-be-used updating cluster gene information and the
cluster gene information of the current standard cloud plat-
form, where the standard cloud platform is a kubernetes-
based container cluster platform. The standard cloud plat-
form gene library is updated according to the comparison
result. The error prone problem caused by not considering
the complex relationship and dependence between compo-
nents in the existing technology is solved. Effectively updat-
ing the standard proprietary cloud platform by using the
automatic method in the K8S proprietary cloud container
cluster environment is realized. The method also includes:
verifying the updated standard cloud platform gene library,
in response to passing the verification; generating the
updated standard cloud platform gene library; and determin-
ing the hardware resource of the final standard cloud plat-
form and the software resource of the final standard cloud
platform, according to the updated standard cloud platform gene library, which solves the technical problem that normal operation of the entire system is easily affected by the change of some components during the upgrade of a large and complex proprietary cloud platform, and ensures the stability and reliability of the proprietary cloud platform system.

Figure 4:
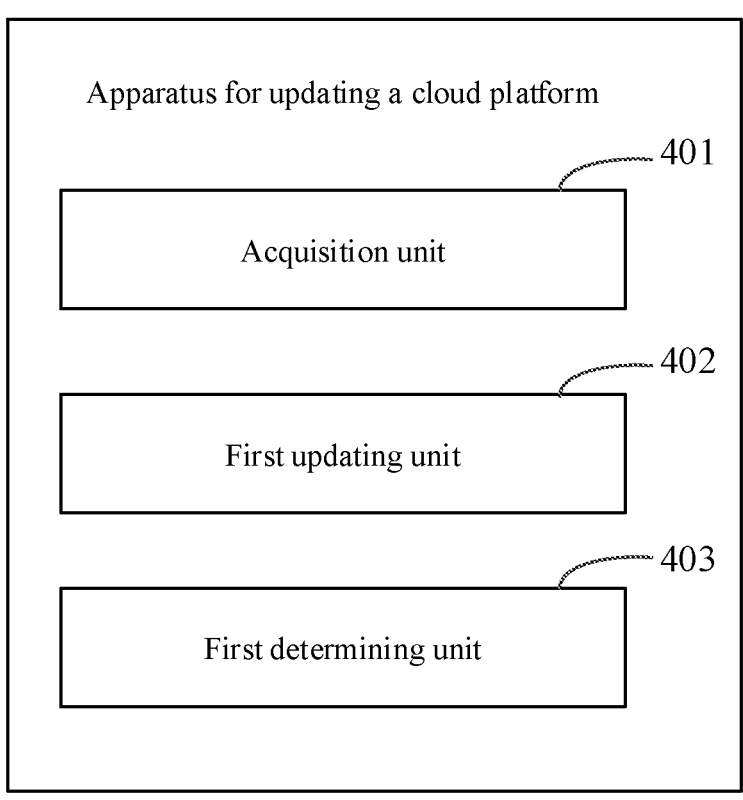
FIG. 4 is a schematic structural diagram of an embodiment of an apparatus for updating a cloud platform according to the present disclosure.

Further referring to FIG. 4, as an implementation of the method shown in the above figures, the present disclosure provides an embodiment of an apparatus for updating a cloud platform. The embodiment of the apparatus corresponds to the embodiment of the method shown in FIG. 1. Particularly, the apparatus may be used in various electronic device.

As shown in FIG. 4, an apparatus 400 for updating a cloud platform in the present embodiment includes: an acquisition unit 401, a first updating unit 402 and a first determining unit 403. The acquisition unit is configured to, in response to receiving a cloud platform update request, acquire to-be-used updating cluster gene information corresponding to the cloud platform update request, where the to-be-used updating cluster gene information is structured information that completely represents information of components in a cloud platform container cluster. The first updating unit is configured to update a standard cloud platform gene library according to a comparison result between the to-be-used updating cluster gene information and cluster gene information of a current standard cloud platform, where the standard cloud platform is a unified cloud platform on which a customer-specific cloud platform is deployed. The first determining unit is configured to determine, according to an updated standard cloud platform gene library, a hardware resource of a final standard cloud platform and a software resource of the final standard cloud platform.

In the present embodiment, for the specific processing and the technical effects of the acquisition unit 401, the first updating unit 402 and the first determining unit 403 in the apparatus 400 for updating a cloud platform, reference may be made to the relevant descriptions of step 101 to step 103 in the corresponding embodiment of FIG. 1, respectively, and detailed description thereof will be omitted.

In some alternative implementations of the present embodiment, the first updating unit includes: a comparison module, configured to compare the to-be-used updating cluster gene information with the cluster gene information of the current standard cloud platform by using a gene comparison model, to obtain the comparison result between the to-be-used updating cluster gene information and the cluster gene information of the current standard cloud platform, where the gene comparison model makes a comparison based on resource types of pieces of gene data in the to-be-used updating cluster gene information and a dependency relationship between the pieces of gene data; and an updating module, configured to update the standard cloud platform gene library according to the comparison result.

In some alternative implementations of the present embodiment, the apparatus further includes: a verification unit, configured to verify the updated standard cloud platform gene library based on integrity and consistency of pieces of gene data and correctness of a dependency relationship between the pieces of gene data in the updated standard cloud platform gene library; and in response to passing the verification, generate the updated standard cloud platform gene library.

In some alternative implementations of the present embodiment, the verification unit is further configured to: in response to not passing the verification, mark an error of the updated standard cloud platform gene library, and determine error location information corresponding to the updated standard cloud platform gene library.

In some alternative implementations of the present embodiment, the standard cloud platform and/or the customer-specific cloud platform is a kubernetes-based container cluster platform.

In some alternative implementations of the present embodiment, the apparatus further includes: a verification unit, configured to verify the to-be-used updating cluster gene information by using the current standard cloud platform, where the verification is used to verify a system stability of the cloud platform where the to-be-used updating cluster gene information is deployed; and in response to passing the verification, perform a subsequent step.

In some alternative implementations of the present embodiment, the apparatus further includes: a second updating unit, configured to update the customer-specific cloud platform according to the final standard cloud platform.

In some alternative implementations of the present embodiment, the apparatus further includes: a second determining unit, configured to determine a to-be-offline product line, according to the updated standard cloud platform gene library; a labeling unit, configured to label cluster gene information corresponding to the to-be-offline product line in the standard cloud platform, according to the to-be-offline product line and based on a dependency relationship between pieces of gene data in the cluster gene information; and a deleting unit, configured to delete the cluster gene information corresponding to the to-be-offline product line in the standard cloud platform, based on the labeled information.

According to an embodiment of the present disclosure, the present disclosure also provides an electronic device and a readable storage medium.

Figure 5:
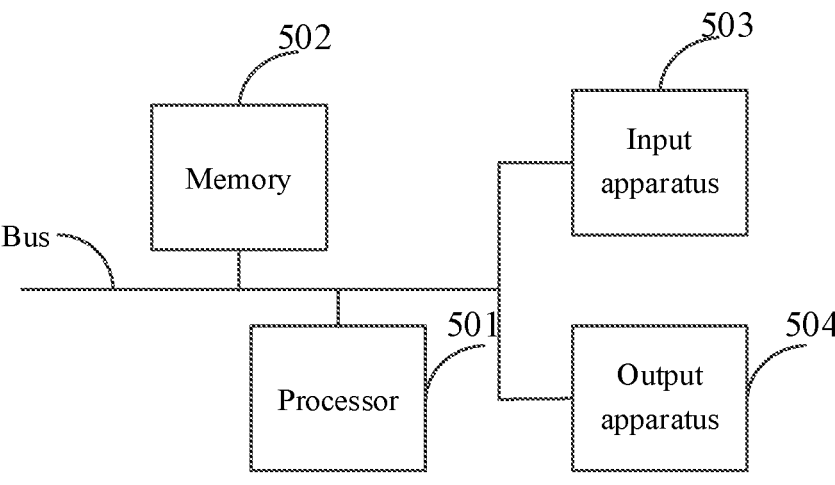
FIG. 5 is a block diagram of an electronic device adapted to implement the method for updating a cloud platform according to an embodiment of the present disclosure.

As shown in FIG. 5, is a block diagram of an electronic device of the method for updating a cloud platform according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 5, the electronic device includes: one or more processors 501, a memory 502, and interfaces for connecting various components, including high-speed interfaces and low-speed interfaces. The various components are interconnected using different buses and may be mounted on a common motherboard or otherwise as desired. The processor may process instructions executed within the electronic device, including instructions stored in or on the memory to display graphical information of a GUI on an external input/output apparatus, such as a display device coupled to the interface. In other embodiments, a plurality of processors and/or a plurality of buses may be used with a plurality of memories and a plurality of memories, if desired. Likewise, a plurality of electronic devices may be connected, each providing some of the necessary operations (e.g., as a server array, a set of blade servers, or a multi-processor system). One processor 501 is used as an example in FIG. 5.

The memory 502 is a non-transitory computer readable storage medium provided by the present disclosure. The memory stores instructions executable by at least one processor, so that the at least one processor executes the method for updating a cloud platform provided by the present disclosure. The non-transitory computer readable storage medium of the present disclosure stores computer instructions, and the computer instructions are used to cause the computer to perform the method for updating a cloud platform provided by the present disclosure.

As a non-transitory computer readable storage medium, the memory 502 may be used to store non-transitory software programs, non-transitory computer-executable programs, and modules, such as program instructions/modules (for example, the acquisition unit 401, the first updating unit 402 and the first determining unit 403 shown in FIG. 4) corresponding to the method for updating a cloud platform in the embodiments of the present disclosure. The processor 501 executes various functional applications and data processing of the server by running the non-transitory software programs, instructions and modules stored in the memory 502, that is, implements the method for updating a cloud platform in the above method embodiments.

The memory 502 may include a stored program area and a stored data area, where the stored program area may store an operating system, an application program required by at least one function; and the stored data area may store data created according to the use of the electronic device for updating a cloud platform, etc. Additionally, the memory 502 may include a high-speed random access memory, and may also include a non-transitory memory, such as at least one magnetic disk storage device, a flash memory device, or other non-transitory solid-state storage device. In some embodiments, the memory 502 may optionally include memories located remotely from the processor 501, and these remote memories may be connected to the electronic device for updating a cloud platform via a network. Examples of such network include, but are not limited to, the Internet, an intranet, a local area network, a mobile communication network, and combinations thereof.

The electronic device of the method for updating a cloud platform may further include: an input apparatus 503 and an output apparatus 504. The processor 501, the memory 502, the input apparatus 503 and the output apparatus 504 may be connected via a bus or in other ways, and connection via a bus is used as an example in FIG. 5.

The input apparatus 603 may receive input digital or character information, and generate key signal inputs related to user settings and function control of the electronic device of the blockchain-based data storage method, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of the embodiments of the present disclosure, in response to receiving a cloud platform update request, acquiring to-be-used updating cluster gene information corresponding to the cloud platform update request, updating a standard cloud platform gene library according to a comparison result between the to-be-used updating cluster gene information and cluster gene information of a current standard cloud platform, and determining, according to an updated standard cloud platform gene library, a hardware resource of a final standard cloud platform and a software resource of the final standard cloud platform. The technical solution solves the technical challenge of huge workload faced by a proprietary cloud platform in the deployment and upgrade process, at the same time it solves the problem of the lack of technical standard system of the proprietary cloud platform. The method employs cluster gene replication and inheritance to realize an automatic update of a unified standard cloud platform.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A computer-implemented method for updating a cloud platform built on the basis of container cluster gene, the method comprising:

in response to receiving a cloud platform update request, acquiring, by a computer processor, to-be-used updating cluster gene information corresponding to the cloud platform update request, wherein the to-be-used updating cluster gene information is structured information that completely represents information of components in a cloud platform container cluster of the cloud platform built on the basis of container cluster gene, wherein the to-be-used updating cluster gene information comprises an association relationship and a dependency relationship of the components in the cloud platform;

updating, by the computer processor, a standard cloud platform gene library according to a comparison result determined by the computer processor between the to-be-used updating cluster gene information and cluster gene information of a current standard cloud platform, wherein the current standard cloud platform is a unified cloud platform on which a customer-specific cloud platform is deployed which is built on the basis of container cluster gene, wherein the to-be-used updating cluster gene information is compared with the cluster gene information of the current standard cloud platform, to determine whether there is a new basic resource in the to-be-used updating cluster gene information; if there is the new basic resource, a first new piece of gene data of the new basic resource is added to a new gene sequence of the current standard cloud platform; if there is no new basic resource, whether in the to-be-used updating cluster gene information, there is a new dependency relationship based on the basic resource is determined; if there is the dependency relationship based on the basic resource, a second new piece of gene data of the new dependency relationship is added to the new gene sequence of the current standard cloud platform; if there is no dependency relationship based on the basic resource, whether there is a new component dependency relationship in the to-be-used updating cluster gene information is determined; if there is a new component dependency relationship, third new pieces of gene data of the new component dependency relationship are added to the new gene sequence of the current standard cloud platform; if there is no new component dependency relationship, an original gene sequence of the current standard cloud platform is replaced with non-new pieces of gene data in the to-be-used updating cluster gene information, and gene library information in the standard cloud platform gene library is updated to obtain updated pieces of gene data, so that a new cluster gene library is consistent with new cluster gene information;

determining, by the computer processor, according to the updated standard cloud platform gene library, an identification of a hardware resource of a final standard cloud platform and an identification of a software resource of the final standard cloud platform; and instructing, by the computer processor, deployment of the customer-specific cloud platform comprising a hardware component and a software component, by using the hardware resource of the final standard cloud platform and the software resource of the final standard cloud platform.

2. The method according to claim 1, wherein the updating the standard cloud platform gene library according to the comparison result between the to-be-used updating cluster gene information and cluster gene information of the current standard cloud platform comprises:

comparing the to-be-used updating cluster gene information with the cluster gene information of the current standard cloud platform by using a gene comparison model, to obtain the comparison result between the to-be-used updating cluster gene information and the cluster gene information of the current standard cloud platform, wherein the gene comparison model makes a comparison based on to-be-used updating pieces of gene data in the to-be-used updating cluster gene information, wherein the to-be-used updating pieces of gene data comprise at least one of: the first new piece of gene data, the second new piece of gene data, the third new pieces of gene data, or the non-new pieces of gene data; and updating the standard cloud platform gene library according to the comparison result.

3. The method according to claim 1, wherein subsequent to the updating the standard cloud platform gene library according to the comparison result between the to-be-used updating cluster gene information and cluster gene information of the current standard cloud platform, the method further comprises:

verifying the updated standard cloud platform gene library based on integrity and consistency of the updated pieces of gene data and correctness of a dependency relationship between the updated pieces of gene data in the updated standard cloud platform gene library; and in response to passing the verification, generating the updated standard cloud platform gene library.

4. The method according to claim 3, wherein the method further comprises:

in response to not passing the verification, marking an error of the updated standard cloud platform gene library, and determining error location information corresponding to the updated standard cloud platform gene library.

5. The method according to claim 1, wherein the current standard cloud platform or the customer-specific cloud platform is a Kubernetes-based container cluster platform.

6. The method according to claim 1, wherein prior to the acquiring to-be-used updating cluster gene information corresponding to the cloud platform update request, the method further comprises:

verifying the to-be-used updating cluster gene information by using the current standard cloud platform, wherein the verification is used to verify a system stability of the cloud platform where the to-be-used updating cluster gene information is deployed; and in response to passing the verification, performing a subsequent step.

7. The method according to claim 1, wherein the method further comprises:

determining a to-be-offline product line according to the updated standard cloud platform gene library;

labeling cluster gene information corresponding to the to-be-offline product line in the updated standard cloud platform according to the to-be-offline product line and based on a dependency relationship between pieces of gene data in the cluster gene information; and deleting the cluster gene information corresponding to the to-be-offline product line in the updated standard cloud platform based on the labeled information.

8. An apparatus for updating a cloud platform built on the basis of container cluster gene, the apparatus comprising:

a processor;

a memory, storing at least one instruction, wherein the at least one instruction, when executed by the processor, causes the processor to perform operations comprising:

in response to receiving a cloud platform update request, acquiring to-be-used updating cluster gene information corresponding to the cloud platform update request, wherein the to-be-used updating cluster gene information is structured information that completely represents information of components in a cloud platform container cluster of the cloud platform built on the basis of container cluster gene, wherein the to-be-used updating cluster gene information comprises an association relationship and a dependency relationship of the components in the cloud platform;

updating a standard cloud platform gene library according to a comparison result determined by the computer processor between the to-be-used updating cluster gene information and cluster gene information of a current standard cloud platform, wherein the current standard cloud platform is a unified cloud platform on which a customer-specific cloud platform is deployed which is built on the basis of container cluster gene, wherein the to-be-used updating cluster gene information is compared with the cluster gene information of the current standard cloud platform, to determine whether there is a new basic resource in the to-be-used updating cluster gene information; if there is the new basic resource, a first new piece of gene data of the new basic resource is added to a new gene sequence of the current standard cloud platform;

if there is no new basic resource, whether in the to-be-used updating cluster gene information, there is a new dependency relationship based on the basic resource is determined; if there is the dependency relationship based on the basic resource, a second new piece of gene data of the new dependency relationship is added to the new gene sequence of the current standard cloud platform; if there is no dependency relationship based on the basic resource, whether there is a new component dependency relationship in the to-be-used updating cluster gene information is determined; if there is a new component dependency relationship, third new pieces of gene data of the new component dependency relationship are added to the new gene sequence of the current standard cloud platform; if there is no new component dependency relationship, an original gene sequence of the current standard cloud platform is replaced with non-new pieces of gene data in the to-be-used updating cluster gene information, and gene library information in the standard cloud platform gene library is updated to obtain updated pieces of gene data, so that a new cluster gene library is consistent with new cluster gene information;

determining, according to the updated standard cloud platform gene library, an identification of a hardware resource of a final standard cloud platform and an identification of a software resource of the final standard cloud platform; and instructing deployment of the customer-specific cloud platform comprising a hardware component and a software component, by using the hardware resource of the final standard cloud platform and the software resource of the final standard cloud platform.

9. The apparatus according to claim 8, wherein the updating the standard cloud platform gene library according to the comparison result between the to-be-used updating cluster gene information and cluster gene information of the current standard cloud platform comprises:

comparing the to-be-used updating cluster gene information with the cluster gene information of the current standard cloud platform by using a gene comparison model, to obtain the comparison result between the to-be-used updating cluster gene information and the cluster gene information of the current standard cloud platform, wherein the gene comparison model makes a comparison based on to-be-used updating pieces of gene data in the to-be-used updating cluster gene information, wherein the to-be-used updating pieces of gene data comprise at least one of: the first new piece of gene data, the second new piece of gene data, the third new pieces of gene data, or the non-new pieces of gene; and updating the standard cloud platform gene library according to the comparison result.

10. The apparatus according to claim 8, wherein the operations further comprise:

verifying the updated standard cloud platform gene library based on integrity and consistency of the updated pieces of gene data and correctness of a dependency relationship between the updated pieces of gene data in the updated standard cloud platform gene library; and in response to passing the verification, generating the updated standard cloud platform gene library.

11. The apparatus according to claim 10, wherein the operations comprise: in response to not passing the verification, mark an error of the updated standard cloud platform gene library, and determining error location information corresponding to the updated standard cloud platform gene library.

12. The apparatus according to claim 8, wherein the current standard cloud platform or the customer-specific cloud platform is a Kubernetes-based container cluster platform.

13. The apparatus according to claim 8, wherein the operations further comprise:

verifying the to-be-used updating cluster gene information by using the current standard cloud platform, wherein the verification is used to verify a system stability of the cloud platform where the to-be-used updating cluster gene information is deployed; and in response to passing the verification, performing a subsequent step.

14. The apparatus according to claim 8, wherein the operations further comprise:

determining a to-be-offline product line, according to the updated standard cloud platform gene library;

labeling cluster gene information corresponding to the to-be-offline product line in the updated standard cloud platform, according to the to-be-offline product line and based on a dependency relationship between pieces of gene data in the cluster gene information; and deleting the cluster gene information corresponding to the to-be-offline product line in the updated standard cloud platform based on the labeled information.

15. A non-transitory computer readable storage medium storing computer instructions, wherein the computer instructions, when executed by a computer processor, cause the computer processor to perform operations comprising:

in response to receiving a cloud platform update request, acquiring by the computer processor, to-be-used updating cluster gene information corresponding to the cloud platform update request, wherein the to-be-used updating cluster gene information is structured information that completely represents information of components in a cloud platform container cluster of a cloud platform built on the basis of container cluster gene, wherein the to-be-used updating cluster gene information comprises an association relationship and a dependency relationship of the components in the cloud platform;

updating a standard cloud platform gene library according to a comparison result between the to-be-used updating cluster gene information and cluster gene information of a current standard cloud platform, wherein the current standard cloud platform is a unified cloud platform on which a customer-specific cloud platform is deployed which is built on the basis of container cluster gene, wherein the updating comprises performing:

wherein the to-be-used updating cluster gene information is compared with the cluster gene information of the current standard cloud platform, to determine whether there is a new basic resource in the to-be-used updating cluster gene information; if there is the new basic resource, a first new piece of gene data of the new basic resource is added to a new gene sequence of the current standard cloud platform; if there is no new basic resource, whether in the to-be-used updating cluster gene information, there is a new dependency relationship based on the basic resource is determined; if there is the dependency relationship based on the basic resource, a second new piece of gene data of the new dependency relationship is added to the new gene sequence of the current standard cloud platform; if there is no dependency relationship based on the basic resource, whether there is a new component dependency relationship in the to-be-used updating cluster gene information is determined;

if there is a new component dependency relationship, third new pieces of gene data of the new component dependency relationship are added to the new gene sequence of the current standard cloud platform; if there is no new component dependency relationship, the original gene sequence of the current standard cloud platform is replaced with the non-new pieces of gene data in the to-be-used updating cluster gene information, and gene library information in the standard cloud platform gene library is updated to obtain updated pieces of gene data, so that a new cluster gene library is consistent with new cluster gene information;

determining, by the computer processor, according to the updated standard cloud platform gene library, an identification of a hardware resource of a final standard cloud platform and an identification of a software resource of the final standard cloud platform; and instructing, by the computer processor, deployment of the customer-specific cloud platform comprising a hardware component and a software component, by using the hardware resource of the final standard cloud platform and the software resource of the final standard cloud platform.

* * * * *